Dec. 23, 1930.  H. M. STURGIS  1,786,037
MOP HEAD
Filed June 17, 1929

INVENTOR
Herbert M. Sturgis
BY
ATTORNEY

Patented Dec. 23, 1930

1,786,037

UNITED STATES PATENT OFFICE

HERBERT M. STURGIS, OF KANSAS CITY, MISSOURI, ASSIGNOR, BY MESNE ASSIGNMENTS, TO LEIGH HUNT, OF KANSAS CITY, MISSOURI

MOP HEAD

Application filed June 17, 1929. Serial No. 371,507.

My invention relates to mops and more particularly to mop heads and frames for supporting swabs of the pocket or bag type, the principal object of the invention being to simplify the means for attaching a frame to a ferrule, to simplify the construction of a wire frame, to adapt a shank member for pivotal mounting on a simplified wire frame, and to latch the frame portions to the shank.

In accomplishing these and other objects of the invention, I have provided improved details of structure, the preferred forms of which are illustrated in the accompanying drawings, wherein.

Figure 1:
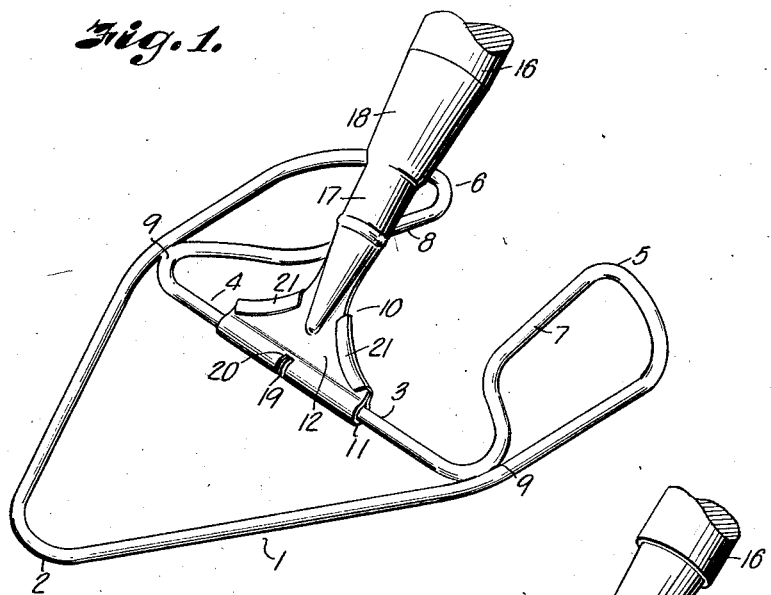
Fig. 1 is a perspective view of a mop head and adjacent handle portion constructed in accordance with my invention.
Figure 2:
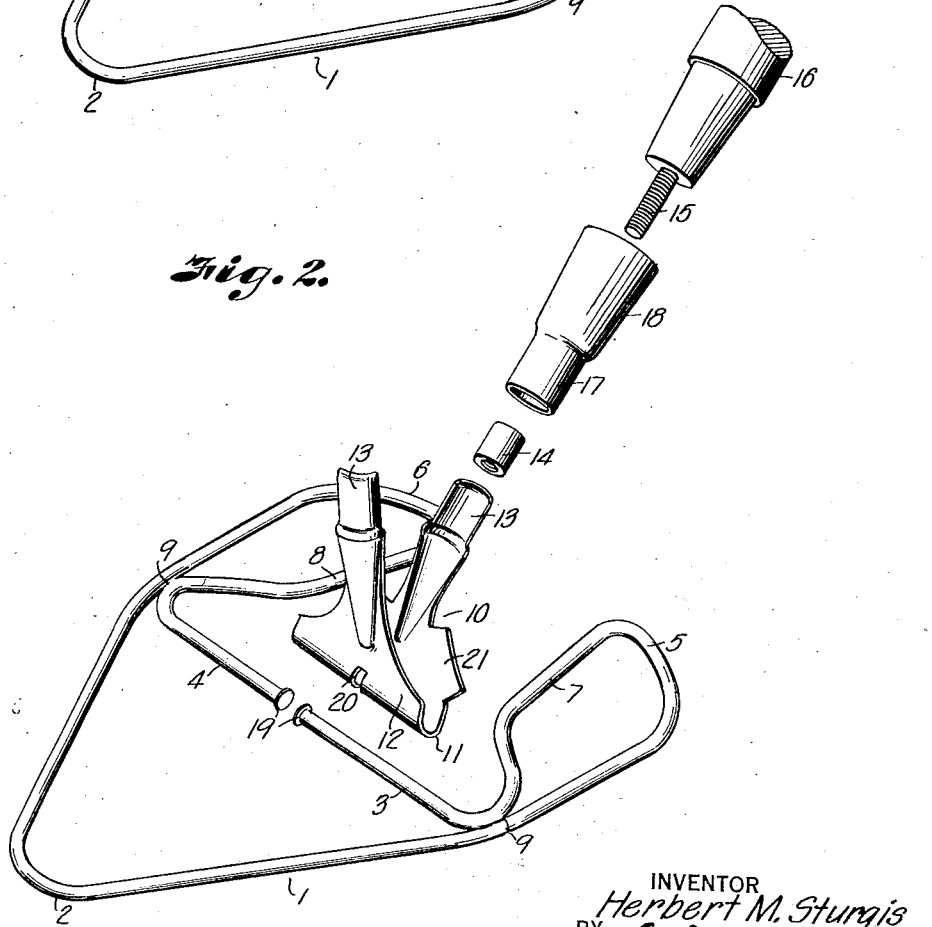
Fig. 2 is a perspective view of a frame and shank member of a mop head and members for connecting a handle with the head, shown in spaced relation, the handle being shown fragmentarily.

Referring in detail to the drawings:

1 designates a frame comprising preferably a single resilient heavy wire bent at its middle to form a toe portion 2, and having its ends bent transversely of the frame toward each other to comprise longitudinally aligned bar-like pivot members 3 and 4.

Intermediate branches of the wire are bent inwardly into loops to form heels 5 and 6 having inner substantially parallel arm 7 and 8 equally spaced from the axis of the frame, and portions adjacent the pivot members are bent outwardly and attached to the longitudinal branches of the frame as at 9, for example by welding.

The pivot members extend laterally across the frame substantially at the longitudinal median line thereof and preferably the wire is initially formed so that the adjacent ends of the aligned bar members are slightly spaced since it is not necessary for the final exact position of the frame members to be conferred when the same are initially bent, as will presently be disclosed.

A clip-like shank member 10 is provided to complete the head and connect the pivot members, having a loop or journal portion 11 adapted for mounting on the pivot members for rotation thereover, and preferably comprising a piece of metal including a plate-like portion 12 bent on its transverse median line to form the loop, and cooperating socket-like semi-cylindrical ends 13 adapted to receive and clampingly retain a plug 14 having internal threads to receive the screw 15 of a handle 16.

The ends 13 when brought together to clamp the plug form a cylindrical stock adapted to be inserted in the reduced end 17 of a ferrule 18, and the handle may be advanced through the ferrule to engage the screw in the plug for clamping the shank and head to the handle.

The shank member is adapted to latch the pivot bar portions of the frame to prevent lateral separation of the branches of the frame, and I accomplish the retention of the frame ends against separation by providing flanges 19 on the pivot members, preferably at their ends, and form a notch or slot 20 in the loop portion of the shank on the axis of the semi-cylindrical ends, so that when the pivot members are mounted in the shank and the halves of the shank are folded together to establish the shank in pivotal relation with the pivot members, the flanges will extend in the slot to latch the ends of the frame to the shank.

The provision of the flanges and slot described not only serves to latch the frame against lateral separation of its parts, but does so in a manner permitting the relatively tight engagement of the plate or loop-forming portion of the shank with the bar-like pivot members so that the halves of the shank may be impressed relatively tightly over the pivot members and extend in close engagement therewith over a substantial extent thereof.

The plate portion of the shank is preferably bent to form substantially a cylindrical journal or loop, and can be so formed after being mounted on the pivot members since the flanges project through the slot and do not obstruct the inner surface of the loop.

The edges of the plate portion preferably extend arcuately from the outer ends of the loop upwardly and merge into the end portions formed to provide the semi-cylindrical plug-receiving elements. One half of the plate forming the shank preferably has tabs or wings 21 adapted to be bent over the arcuate edge of the other half to securely clamp and bind the two halves or shank ends together, and secure the shank in journal-forming position and in pivotal engagement with the pivot members.

The clamping of the halves of the shank together further enforces the engagement of the loop portion with the pivot members and compresses the plate-like portions to reduce the diameter of the journal opening in the shank and so assure the retention of the end flanges of the pivot members in the slot.

A mop head constructed as described may be mounted in a swab bag or pocket, and the handle and shank are adapted to move between the heel portions of the frame, the shank being sufficiently freely rotatable on the pivot portions of the frame to permit the swab and frame to be moved pivotally with reference to the handle for reversing the swab. The tendency of the frame branches to separate is restrained by the latching engagement of the pivot member flanges with the shoulders of the shank slot and tend to latch the frame against pivoting.

The shank member is relatively strong and sturdy and its substantially unitary and continuous loop portion extends a relatively great distance over both of the connected bar-like members of the frame, and thus braces and stabilizes the relatively light frame so that the structure is substantially as strong and stable as though much more material and a greater number of parts were employed.

What I claim and desire to secure by Letters Patent is:

1. In a mop head, a frame including aligning, transverse pivot bars terminating in spaced relation and a slotted handle shank pivotally mounted on said bars, the bars having end flanges freely rotative in the shank slot for limiting transverse movement of the shank.

2. A mop head including a frame formed from a single piece of wire bent to form sides, a front toe portion and inwardly looped rear heel portions, the heel portions being bent outwardly at their inner ends and secured to the sides and the ends of the wire terminating in transversely aligning pivot bars having spaced and flanged free ends, and a handle shank including a plate bent to form wings and a cylindrical portion pivotally mounted on said pivot bars and having a central slot seating the bar flanges.

3. A mop head including a frame having aligned cylindrical pivot bars in end-abutting relation, flanges on the abutting ends of said bars, and a handle shank including a cylindrical portion having a slot to receive said flanges for freely rotatively mounting said portion on said bars and form shoulders engageable with said flanges for latching the bars in said cylindrical portion.

In testimony whereof I affix my signature.

HERBERT M. STURGIS.